Aug. 2, 1966  R. H. MUSSER  3,263,703
PLURAL VALVES WITH BALANCING CHAMBER
Filed Sept. 3, 1963
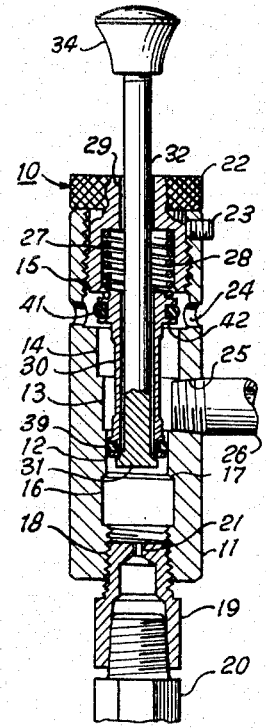
FIG. 1
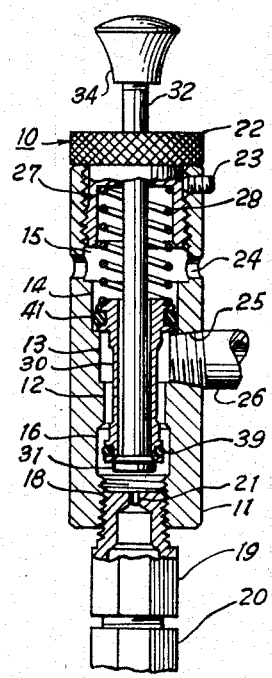
FIG. 3
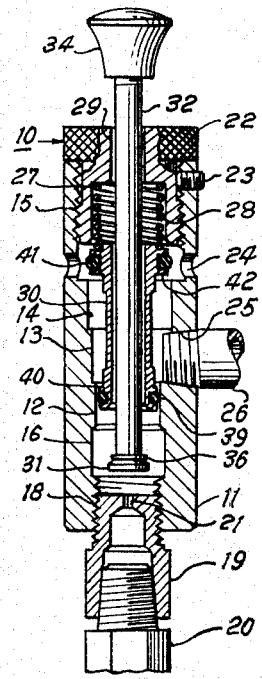
FIG. 2
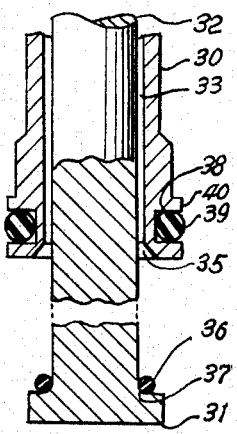
FIG. 5
FIG. 4
INVENTOR
Rufus H. Musser
BY Ehley & Ehley
ATTORNEYS United States Patent Office 3,263,703
Patented August 2, 1966

3,263,703
PLURAL VALVES WITH BALANCING CHAMBER
Rufus H. Musser, Graham, Tex. (Box 630, Terrell, Tex.)
Filed Sept. 3, 1963, Ser. No. 305,982
11 Claims. (Cl. 137—630.13)

This invention relates to new and useful improvements in valves.

One object of the invention is to provide an improved valve for controlling the flow of fluid under pressure to and from a delivery opening and having novel valve means which is held in closed position by the pressure of the fluid and which is movable to opened position for admitting said fluid to the delivery opening, said valve means permitting the escape of pressure fluid from said opening when said means is in its closed position as well as when the pressure of the fluid in said opening becomes excessive.

Another object of the invention is to provide an improved valve for controlling the flow of pressure fluid to and from a delivery opening and having a valve member closeable by the pressure of the fluid and openable to admit said fluid to the delivery opening, and a valve element for venting pressure fluid from said opening upon closing of the valve member and when the fluid in said opening exceeds a predetermined pressure, the valve element being held opened by the pressure fluid and coacting with said valve member to control the flow of said fluid to said opening.

A further object of the invention is to provide an improved valve, of the character described, wherein the valve element closes upon opening of the valve member and assists in holding said member opened, wherein said valve element coacts with said valve member in the closing thereof by the pressure fluid, and wherein said valve element opens when said valve member is held opened.

An important object of the invention is to provide an improved valve, of the character described, wherein the valve member has a portion slidably through the valve element and a portion engageable with said valve element to assist in holding said element opened when said valve member is closed, said valve element having a portion for controlling the flow of pressure fluid from the delivery opening and a portion for coacting with said valve member to assist the closing thereof.

A particular object of the invention is to provide an improved valve, of the character described, wherein the valve element is tubular for slidably surrounding a portion of the valve member and has annular valve means for coacting with said valve member to assist the closing thereof, said valve element having additional valve means of greater area to permit opening of said element by excessive pressure in the delivery opening irrespective of the position of said valve member.

A construction designed to carry out the invention will be hereinafter described, together with other features of the invention.

The invention will be more readily understood from a reading of the following specification and by reference to the accompanying drawing, wherein an example of the invention is shown, and wherein:

FIG. 1 is a longitudinal sectional view of a valve constructed in accordance with the invention with its valve member closed and its valve element opened, FIG. 2 is a view, similar to FIG. 1, showing the valve member opened, FIG. 3 is a view, similar to FIG. 1, showing the valve member opened and the valve element closed, FIG. 4 is a view, similar to FIG. 1, showing the closing movement of the valve member and opening movement of the valve element, and FIG. 5 is an enlarged, longitudinal section view of the lower portions of the valve member and valve element.

In the drawing, the numeral 10 designates a manual control valve embodying the principles of the invention and including an elongated body 11 having an axial, cylindrical bore or passage 12 extending longitudinally therethrough. One end or the downstream portion of the bore 12 is progressively enlarged in steps to provide a plurality of counterbores 13, 14 and 15 of increasing diameter in a downstream direction. A counterbore 16, of substantially the same diameter as the counterbore 13, is formed in the other end or upstream portion of the bore of the valve body 11 and, preferably, has an annular, bevelled surface 17 at its inner or downstream end. Upstream or outwardly of the counterbore 16, the bore 12 has a screwthreaded end portion 18 for receiving an inlet fitting 19 to which the coupling 20 of a conductor (not shown) is connected for supplying air or other fluid under pressure to said bore. An axial orifice 21, of relatively small diameter, may be formed in the fitting 19 to restrict the flow of pressure fluid into the bore.

The downstream or opposite end of the bore 12 is closed by a flanged cap 22 which is screwthreaded in the largest and outermost counterbore 15 and locked against displacement by a set screw 23. A plurality of radial, outlet ports 24 communicates with the latter counterbore through the wall of the valve body upstream or inwardly of the cap 22, while the innermost or smallest counterbore 13 has a radial delivery opening 25 communicating therewith for screwthreaded engagement by a lateral nipple or pipe 26. Although not shown, the nipple 26 is adapted to be connected to a pressure chamber or other means adapted to contain air or other fluid under pressure for conducting the pressure fluid to and from the chamber or means.

An axial recess or socket 27 is formed in the inner portion of the cap 22 to receive a complementary helical spring 28 and communicates with a concentric, reduced opening 29 in the outer extremity of said cap. The downstream or outer end of a tubular valve element or sleeve 30 is confined in or surrounded by the inner end of the spring 28 whereby the valve sleeve is urged upstream or inwardly. A circular valve member or head 31 has its elongate, upstanding rod or stem 32 extending axially through the bore 33 of the valve sleeve 30, the spring 28 and the axial opening 29 of the cap so as to project from the valve body 11 for supporting an overlying, enlarged head or knob 34 in spaced relation to said cap. As shown most clearly in FIG. 5, the bore 33 of the valve sleeve is of sufficiently greater diameter than the valve rod 32 to permit the flow of fluid therebetween and has an annular, bevelled seat 35 at its upstream or inner end for coacting with the valve head 31 for controlling flow through said bore.

An O-ring or other annular packing 36 is confined on the base of the valve head for sealing engagement with the seat 35 to prevent flow through the valve sleeve 30, said base being bevelled complementarily to said seat and having the packing recessed therein as shown at 37. The upstream or inner end of the valve sleeve is enlarged and has an external, annular groove or recess 38 for receiving an O-ring or other annular packing 39 which is complementary to and adapted to sealingly engage the bore 12 (FIGS. 1 and 2). Preferably, the groove 38 is formed by coacting radial flanges 40 as best illustrated in FIG. 5. An O-ring or other annular packing 41 is mounted similarly between flanges 42 on the downstream or outer, enlarged end of the valve sleeve 30 and is complementary to the counterbore 14 for sealing engagement therewith, it being noted that the packing 41 and flanges 42 are of greater diameter and effective area than the lower packing 39 and flanges 40.

When air or other fluid under pressure is supplied to valve 10 through the inlet fitting 19, the valve head 31 is moved downstream into the bore 12 of the body 11 to prevent flow through said bore to its delivery opening 25 and the nipple 26 in coaction with the valve sleeve 30 (FIG. 1). Due to this downstream movement of the valve head, its packing 36 sealingly engages the seat 35 of the valve sleeve and moves said sleeve downstream so as to compress the spring 28 and dispose the upstream or inner packing 39 within the bore for sealing engagement therewith. The downstream or outer packing 41 of the valve sleeve 30 is disposed within the largest counterbore 15 of the valve body and, since said counterbore is of greater diameter than said packing, communication is established between the outlet ports 24 and delivery opening 25 through the counterbores 13–15 to permit the escape of any pressure in the pressure chamber or other means which communicates with the valve through said opening.

Upon depressing the valve rod 32 by means of its knob 34, the valve head 31 is lowered out of the bore 12 into the counterbore 16 so as to disengage its packing 36 from the valve sleeve seat 35 and permit the flow of air or other fluid through the sleeve bore 33 around said valve head and rod (FIG. 2). From the latter bore, the fluid flows into the counterbore 15 so as to substantially equalize the pressures above and below or at the opposite ends of the valve sleeve and permit upstream movement thereof by the force of the compressed spring (FIG. 3). In this position of the valve sleeve 30, its upstream packing 39 is disposed within the counterbore 16 to permit the fluid to flow around said sleeve and through the bore 12 and counterbore 13 to the opening 25. Also, the seat 35 of the valve sleeve reengages the packing 36 of the valve head to prevent flow through the bore 33 of said sleeve and the downstream packing 41 is moved upstream from the counterbore 15 into the counterbore 14 to shut off communication between the outlet ports 24 and opening 25 so as to prevent the escape of fluid through said ports.

From the foregoing, it is readily apparent that the packings 39 and 41 and flanges 40 and 42 of the valve sleeve 30 function as annular valve means for controlling the flow of pressure fluid to and from the opening 25 of the valve body 11 in coaction with the valve head 31. When the pressure of the fluid within the delivery opening equals the pressure of the fluid admitted to the counterbore 16 through the inlet fitting 19, it exceeds the force of the spring 28 and compresses said spring so as to move the valve sleeve downstream until its upstream packing engages the bevelled surface 17 at the downstream end of said counterbore. This downstream movement of the valve sleeve 30 is due to its downstream packing 41 being of greater effective area than its upstream packing 39. As shown in FIG. 4, the valve head 31 moves downstream with the valve sleeve when the knob 34 of the valve rod 32 is released and this conjoint movement continues until the upstream packing of said valve sleeve is disposed within and sealingly engages the bore 12. As soon as the upstream packing 39 engages the surface 17, the valve sleeve and valve head are forced downstream to the position shown in FIG. 1 by the pressure of the fluid admitted to the counterbore 16 through the inlet fitting.

In the event that the valve head is held in its opened position by depression of the valve rod, the pressure of the fluid within the opening 25 causes downstream movement of the valve sleeve 30 relative to said valve head and rod until the downstream packing 41 moves out of the counterbore 14 into the counterbore 15, as shown in FIG. 2, so as to permit venting of said pressure through the outlet ports 24. Although flow through the counterbore 16 is prevented by the upstream packing 39, the fluid entering said counterbore may flow through the bore 33 of the valve sleeve and around the upper end thereof so as to be vented through the outlet ports. It is noted that the force of the spring 28 may be varied by adjustment of the cap 22 and that said cap may be secured in adjusted positions by the set screw 23.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A valve including a body having a bore, an inlet for fluid under pressure at one end portion of the bore, an outlet at the opposite end portion of said bore, said bore having a delivery opening between and communicating with the inlet and outlet, a valve member reciprocable in said bore between the delivery opening and inlet, a tubular valve element reciprocable in said bore downstream of the valve member into and out of sealing engagement therewith and extending upstream and downstream of said delivery opening for movement between a first position establishing communication between the outlet and delivery opening while preventing communication between said inlet and opening and a second position establishing communication between said opening and inlet while preventing communication between said inlet and outlet, means for urging said valve element upstream to its second position to prevent flow from said delivery opening to said outlet and into engagement with said valve member to prevent flow through said element, said valve element being movable downstream by the pressure fluid to its first position to premit flow from said opening to said outlet, said valve member being movable downstream with said valve element by the pressure fluid to said first position to prevent flow from said inlet to said opening in coaction with said element, and means extending from said valve member to the exterior of the body to permit manual upstream movement of said member and disengagement thereof from said valve element to permit the flow of pressure fluid from said inlet to said outlet through said element to equalize the pressures upstream and downstream of said element and permit upstream movement thereof by the urging means to its second position and reengagement with said member to direct the flow of fluid from said inlet to said opening.

2. A valve as set forth in claim 1 wherein the means extending from the valve member to the exterior of the body projects longitudinally through the tubular valve element.

3. A valve as set forth in claim 1 wherein the means extending from the valve member to the exterior of the body includes a rod integral with said member and projecting axially downstream thereof, the tubular valve having an axial bore of greater diameter than the rod and through which said rod extends.

4. A valve as set forth in claim 1 wherein the means for urging the tubular valve element upstream includes a helical spring engaging the downstream end portion of said element.

5. A valve as set forth in claim 1 wherein the tubular valve element has annular valve means on its upstream and downstream end portions for coacting with the bore of the body, the downstream valve means being of greater effective area than the upstream valve means whereby said valve element is moved downstream to its first position to permit the escape of the pressure fluid when the pressure of the fluid in the delivery opening exceeds the force of the means urging said element upstream.

6. A valve as set forth in claim 5 wherein the tubular valve element has an axial bore, the means extending from the valve member to the exterior of the body including an axial rod of less diameter than the bore and projecting therethrough.

7. A valve as set forth in claim 5 wherein the body has upstream and downstream counterbores coaxial and communicating with its bore, the downstream counterbore being of a diameter complementary to the downstream annular valve means of the tubular valve element for sealing engagement therewith, the upstream counterbore being of greater effective area than the upstream annular valve means of said valve element to permit communication of the inlet and delivery opening therebetween.

8. A valve as set forth in claim 7 wherein the tubular valve element has an axial bore, the means extending from the valve member to the exterior of the body including an axial rod of less diameter than the bore and projecting therethrough.

9. A valve as set forth in claim 1 wherein the tubular valve element includes a sleeve having externally enlarged upstream and downstream end portions for coacting with the bore of the body, the downstream end portion being of greater diameter than the upstream end portion whereby said valve element is moved downstream to its first position to permit the escape of the pressure fluid when the pressure of the fluid in the delivery opening exceeds the force of the means urging said element upstream.

10. A valve as set forth in claim 9 wherein the body has upstream and downstream counterbores coaxial and communicating with its bore, the downstream counterbore being of a diameter complementary to the downstream end portion of the tubular valve element for sealing engagement therewith, the upstream counterbore being of greater diameter than the upstream end portion of said valve element to permit communication of the inlet and delivery opening therebetween.

11. A valve as set forth in claim 9 wherein the means extending from the valve member to the exterior of the body includes an axial rod projecting longitudinally through the sleeve of the tubular valve element.

References Cited by the Examiner

UNITED STATES PATENTS

| | | | |
|---|---|---|---|
| 238,504 | 3/1881 | Harvey | 137—596.14 |
| 612,448 | 10/1898 | Watson | 137—630.15 |
| 759,530 | 5/1904 | Kelly | 137—630 X |
| 828,374 | 8/1906 | Blein | 137—630.15 |
| 2,411,837 | 11/1946 | Stephens | 137—630.14 X |
| 2,899,935 | 8/1959 | Doeton | 137—630.14 X |
| 3,048,194 | 8/1962 | Huthsing | 137—630.15 |

WILLIAM F. O'DEA, *Primary Examiner.*

CLARENCE R. GORDON, *Examiner.*